United States Patent
O'Connell

(10) Patent No.: US 7,586,674 B2
(45) Date of Patent: Sep. 8, 2009

(54) COMPUSCOPE

(75) Inventor: Daniel G. O'Connell, Wailuku, HI (US)

(73) Assignee: HNU-Photonics, Wailuku, HI (US)

(*) Notice: Subject to any disclaimer, the term of this patent is extended or adjusted under 35 U.S.C. 154(b) by 373 days.

(21) Appl. No.: 11/581,743

(22) Filed: Oct. 17, 2006

(65) Prior Publication Data

US 2008/0088918 A1   Apr. 17, 2008

(51) Int. Cl.
*G02B 5/00* (2006.01)
(52) U.S. Cl. .................................... 359/368
(58) Field of Classification Search ........... 359/368
See application file for complete search history.

(56) References Cited

U.S. PATENT DOCUMENTS

| 4,873,653 | A | 10/1989 | Grosskopf |
| 5,818,637 | A | 10/1998 | Hoover et al. |
| 6,388,807 | B1 | 5/2002 | Knebel |
| 7,027,628 | B1 | 4/2006 | Gagnon et al. |
| 2002/0149845 | A1* | 10/2002 | Mayer ................. 359/391 |
| 2004/0101210 | A1 | 5/2004 | Weinstein et al. |

* cited by examiner

*Primary Examiner*—Joshua L Pritchett
(74) *Attorney, Agent, or Firm*—Morgan Lewis & Bockius LLP

(57) ABSTRACT

The present invention is directed to a microscope mounted into a computer, such as e.g., a desktop, workstation, or laptop. The microscope mounted into the computer has a light source component, a microscope component, and a light analysis component. The light source component is connected to the microscope component, which in turn is connected to the light analysis component. This device is advantageously compact and can be used for a variety of microscope techniques such as, e.g., epi-illumination, trans-illumination, and fluorescence microscopy.

22 Claims, 11 Drawing Sheets

COMPUSCOPE

COMPACT DISK

Not Applicable.

SEQUENCE LISTING

Not Applicable.

BACKGROUND OF THE INVENTION

I. Field of the Invention

The present invention relates to a microscope, and more particularly to a microscope built into a computer.

II. Description of Related Art

Traditional bench top microscopes are heavy, bulky and occupy a large area on a bench or table. Confocal microscopes can weigh several hundred pounds, cost several hundred thousand dollars, and occupy a large bench dedicated to the instrument. These powerful instruments are not accessible to every person who can benefit from them, due in part to size and cost considerations.

The size and shape of a high power microscope is the result of many years of evolution from the first microscopes in the $18^{th}$ century; however, the ergonomics of the original microscope have not changed much since its invention. The large size and bulky shape of microscope technology on the market today is based largely on tradition and the user's expectation of what a microscope should look like. For instance, the user is accustomed to using a bulky eyepiece viewer to observe a sample, despite the fact that the optical glass used in a microscope for imaging can be held in the palm of one's hand. Traditional expectations also dictate that the microscope platform must be large, bulky, rigid, and expensive.

U.S. Pat. No. 7,027,628 is directed to an automated microscope and computer system that captures a set of images for a capture area in a plurality of focal planes. Although this patent discloses an automated means of providing a microscopic view of a biological sample, it is not directed to microscope that is built into a computer.

A need exists for a portable, relatively inexpensive microscope that can be as accessible to institutions and the general public at large as personal computers.

SUMMARY

The Confocal Microscope in a Laptop (CMIAL) invention, which is described herein, has the potential of putting a high power microscope in the hands of everyone that can benefit from one. The CMIAL technology is portable, costs considerably less than conventional confocal microscope technology, and can provide additional capability for experiments in the field, at home or in the classroom. Institutions that use microscopes (e.g., university laboratories, medical clinics, hospitals) would be able to access high power microscope technology, including confocal microscopy. Utilizing miniature optics (including micro-optics), the CMIAL invention described herein may change the face of microscopy and computer laboratory instrumentation.

The present invention is therefore directed to a computer-based microscope that substantially obviates one or more of the problems due to the limitations and disadvantages of the related art.

A CMIAL contains a light source component, which has a means for producing a beam of light, a microscope component with at least one microscope that has a lens system to focus an image carried by the beam of light onto an imaging plane, a light analysis component, and a computer. The light source component, microscope component and light analysis component are all built into the computer such as, e.g., a desktop, a workstation, and a portable laptop. The CMIAL is a computer mounted microscope, which may also have optional interchangeable accessories. For example, the CMIAL may have an external light input port, an external analysis port, or a viewing port.

The light source component is connected to the microscope component, and the microscope component is connected to the light analysis component. The light source component may be mounted inside the microscope component. In one embodiment, the light source is selected from an LED, a laser diode, a white light source, a tungsten halogen light source, a UV light source, an infrared light source and a visible light source. The light source may be any light or laser source.

The microscope component may contain a means for holding a sample, such as e.g., a retractable carriage, a microscope slide carrier, a multi-dimensional translation stage or a sample scanner. The microscope component may also comprise a selectable beam splitter cube turret that enables fluorescence, dark field, bright field, or phase contrast imaging. The microscope component may also comprise a modular attachment such as e.g., a miniature microscope stage, a laser scanner, a sample scanner, filter wheels, adjustable apertures, multiple objective lenses, adjustable magnification imaging lens.

The light analysis component contains at least one optical assembly used to analyze light collected from the sample, which may be e.g., an imaging detector or detector array. The light analysis component may be a photodiode, an imaging detector array, a spectrometer, a polarimeter, a photometer, a medical sensor, a fluorescence imager, a fluorescence analyzer, a Charge Couple Device, a Complimentary Metal Oxide Semiconductor, and an Avalanche Photodiode.

In one embodiment of the invention, the light source component, the microscope component, and the light analysis component are each interchangeable accessory modules.

In another embodiment, the computer mounted microscope also includes at least one epi-illumination or trans-illumination module. The module contains a magnification lens, filters, and a selectable numerical aperture objective.

The CMIAL may contain a dual mode epi-illumination and trans-illumination microscope, a dual Field-Of-View (FOV) microscope, an epi-illumination microscope or trans-illumination microscope. Alternatively, the CMIAL may contain a confocal microscope that incorporates laser scanning of the sample or a fluorescence microscope that incorporates fluorescence filters and dichroic beam splitter.

Additional features and advantages of the invention will be set forth in the description that follows, and will be apparent, in part, from the description, or may be learned by practice of the invention. The objectives and other advantages of the invention will be realized and attained by the structure particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
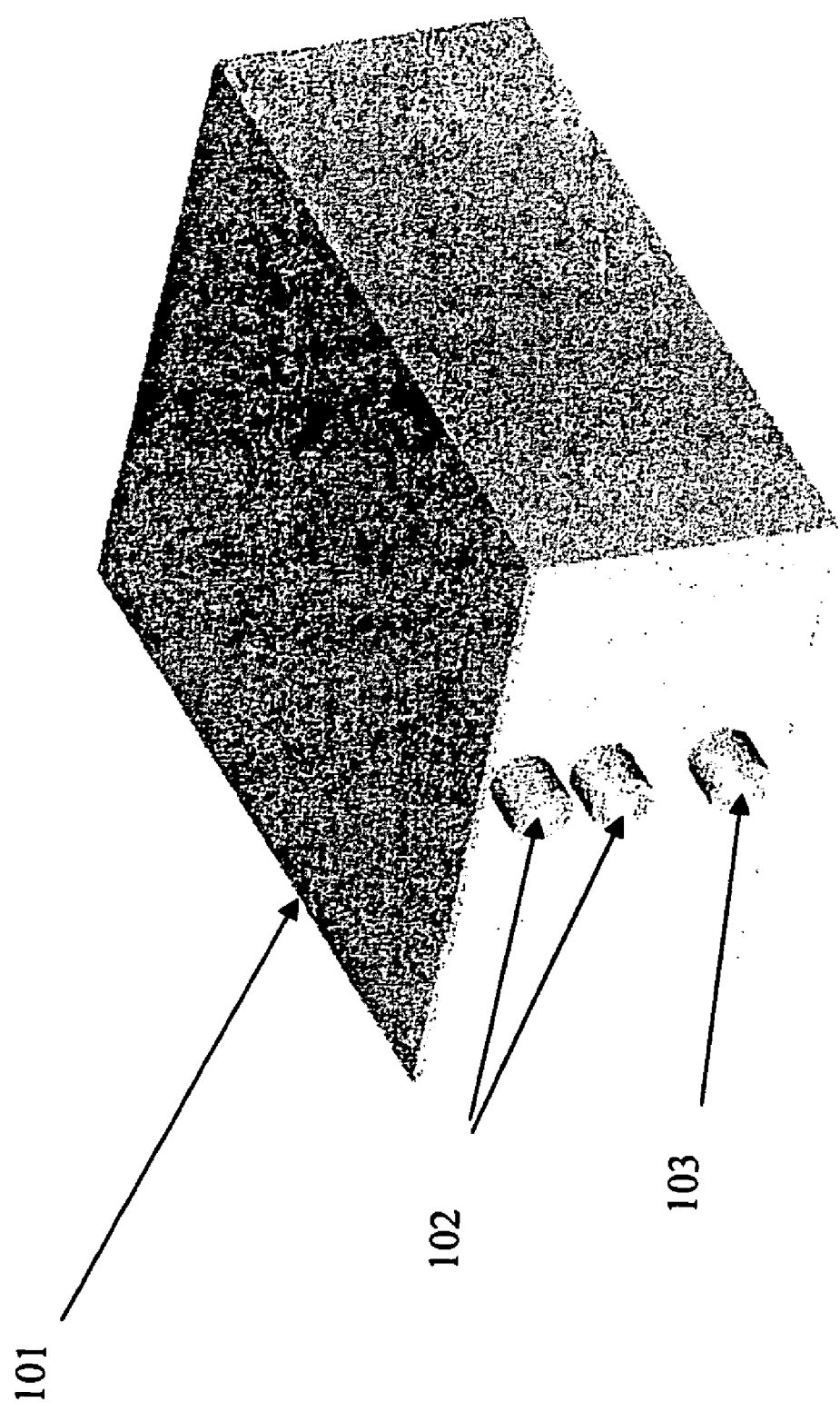
FIG. 1 is a diagram of a CMIAL instrument module housing built into a desktop computer, wherein external ports are shown such that internal or external illumination and internal or external light analysis instrumentation can be utilized.

The embodiments of the Confocal Microscope in a Laptop (CMIAL) invention described herein comprise a high power microscope and accessory optical analysis instrumentation built into a computer (FIGS. 1 & 2), including, but not limited to, a desktop, workstation or portable laptop. The microscope can have the configuration of a medium to high power microscope, including a miniature confocal microscope (see FIGS. 3 & 4).

As used herein, Confocal Microscope in a Laptop (CMIAL) is not limited to a laptop and includes any high power microscope and accessory optical analysis instrumentation built into a computer, such as e.g., a desktop, a workstation, or a laptop.

The CMIAL technology has the potential of making conventional laboratory microscopes obsolete. Traditional microscopes are bulky, heavy, and expensive and occupy considerable space in a laboratory. Traditionally, the optical interface between the user and the sample is through an eyepiece viewer. A CMIAL incorporates a high power microscope inside a computer with removable attachments (see FIG. 1), where the computer screen serves as the image display. Since a CMIAL is lightweight and portable, it can be taken, for example, into the field, home, hospital room, forensic lab, or crime scene.

The CMIAL technology will open the door to a wide range of applications and markets. Currently, high power microscopes are heavy, expensive, and difficult to use, thus limiting their use and benefit to a limited market of experienced professionals. The CMIAL system incorporates high power optical, electronic and data collection technology that is portable and affordable (comparable in price to high-end laptop computer technology).

Several key innovations associated with this invention are described herein, including simultaneous multiple fields of view microscope imaging optics. A wide field objective module displays the entire sample or large portion of the sample while a high power or narrow field objective displays a highly magnified view of the region of interest. In addition, the CMIAL computer microscope may combine an epi-illumination and trans-illumination microscope to benefit the broadest range of applications. A number of light sources can be housed within interchangeable accessory modules in addition to an input beam-switching mirror that enables external light sources to be brought into the optical mainframe module.

CMIAL technology also integrates conventional microscopy with high-tech computing and allows for advanced processing of the image. For example, the image may be electronically enhanced or compared to images in a database.

The CMIAL system enables the user, e.g., researcher, professional, or student, to bring a high power instrument into the field by taking the laboratory to the experiment or sample rather than taking the sample back to the laboratory.

Furthermore, the CMIAL technology may have a tremendous impact on health care by enabling certain medical tests to be performed in the privacy of ones' home and reducing the number of required visits to a physician and therefore reducing the overall cost of health care. Medical sensor modules connect to the CMIAL mainframe including, but not limited to, tests for diabetes, pregnancy, analysis of skin lesions and the like.

A key innovation of the CMIAL instrument is a second imaging system that simultaneously images the entire sample or a larger portion thereof than can be viewed with the high magnification objective. The wide field module views along the same line of sight as the high magnification (narrow field) objective. This allows the user to view and maneuver the sample to a desired location for high magnification analysis.

I. General CMIAL Structure

The CMIAL may comprise of a light source component, a microscope component, and an analysis component each as a separate interchangeable module. Alternatively, the CMIAL may be a single device that contains the light source component, the microscope component, and the analysis component. The light source component provides a beam of light, which illuminates the sample so that it may be magnified in the microscope module and analyzed in the light analysis component. Thus, the CMIAL is a computer mounted microscope, i.e., a microscope mounted within a computer.

In the microscope component, light reflected from the sample is directed to either a detector or imaging array or a light analysis component for further interrogation of the light beam. Light collected from the sample is redirected with a removable fold mirror or beam splitter cube towards a light analysis component. Light enters the analysis component and is focused to match the entrance numerical aperture of the analysis instrument into a spectrometer, polarimeter, or other medical diagnostic optical system.

The light analysis component contains at least one optical assembly to analyze the light collected from the sample, such as e.g., image analysis, spectral analysis, fluorescence analysis, polarimeter, photometer, medical modules for serum analysis, blood work.

The microscope component contains an internal light delivery or illumination system comprising relay optics, a filter, and optionally, an aperture assembly. The microscope component may further contain a beam splitter assembly that separates the illumination beam with the imaging beam and focusing objective lens. The microscope component may also contain a selectable magnification image lens.

In one embodiment of the invention, the light source component, the microscope component, and the light analysis component are each interchangeable accessory modules.

In another embodiment of the invention, the light source component and microscope component are combined.

The focusing objective lens can be a single lens or a multiple lens holder in the form of a rotary turret or translation stage. Additionally, the microscope component may contain a re-imaging lens that focuses the light collected from the sample to a detector that is selectable from a range of detectors, including a single detector, a 1-dimensional detector array, or a 2-dimensional detector array.

Miniature light analysis instruments are built into the computer and optically interfaced to the output of the optical microscope mainframe, using interchangeable accessory detector modules including, but not limited to, a photodiode, an imaging detector array, a spectrometer, a polarimeter, a photometer or a fluorometer.

An output beam-switching mirror enables light to be directed outside the computer to interface with external light analysis instrumentation that may be available to the user. The mainframe microscope component can be interchangeable and therefore removable from the computer chassis. A connecting cord enables certain models or modules of the CMIAL system to be removed from the computer chassis to access samples that cannot be prepared on sample holders and inserted inside the CMIAL sample compartment. An external viewing port is also available that enables samples to be viewed when placed on top of the computer viewing port or underneath a computer viewing port.

Alternatively, the CMIAL may be mounted in an external module and be connected to a computer via a port on the computer, such as e.g., a USB port. The connection to the computer could also be achieved via IR or WiFi technology.

The CMIAL system incorporates an imaging system with multiple fields of view to enable the user to view the entire sample or slide and to guide the sample to the desired location. The wide field imager is aligned and co-borsighted to the narrow field microscope imager. Light directed towards the microscope imager can be diverted to a spectrometer module or other future accessory modules, such as e.g., a photometer, a fluorescence imager, or fluorescence analyzer.

The CMIAL system utilizes the screen of the computer as the data or image viewer. The CMIAL system interfaces electronically to the computer motherboard and utilizes the onboard computational power of the computer in addition to embedded electronics and data collection systems within the microscope module.

The CMIAL system can be described as a high power microscope module including a confocal microscope module miniaturized and built into interchangeable modules that interface to a laptop computer, desktop, mainframe or any freestanding computer system. The CMIAL system is not limited to any computer manufacturer but can be optimized to any computer including mechanical and electrical hardware and software interfaces.

The CMIAL system incorporates several light sources including, e.g., miniature fluorescent lamps, multiple Light Emitting Diode (LED) illuminators including, but not limited to, specific color LED's, UV, blue, green, yellow, red, multi-color or broad-band white light. These light sources maybe part of the light source component or they may be their own separate light source accessory module. The CMIAL system also incorporates additional light source accessories including, but not limited to, Laser Diode (LD) modules of different frequency and power control modules including tunable diodes. The CMIAL system has an optical path to allow external light sources to be used and coupled to the CMIAL microscope imaging and data analysis system. Illumination sources are built in and integral to the CMIAL system for the user to select; however, external light sources can be interfaced to the CMIAL system.

In one embodiment of the invention, the light source is selectable from a variety of built-in illumination sources including, but not limited to, an LED, a laser diode, a white light source, a tungsten halogen light source, a UV light source, an infrared light source, a visible light source.

The main optical module used in the CMIAL system can be built into a desktop computer similar to how a removable hard disk drive or removable accessory modules is built into a computer. In another embodiment, the main optical module can be built into a laptop computer similar to how a CD or DVD drive, battery module or other removable modules is built into a laptop computer. Additional optical, electrical, sensor, or medical measuring device modules can be interfaced to the CMIAL mainframe module.

The fluorescence module can include filter wheel units and various illumination sources for conventional fluorescence light microscopy techniques including, but not limited to, fluorescein isothiocyanate (FITC) staining. An ultraviolet LED light source as well as color LED and, optionally, different wavelength laser diodes may be built into the CMIAL system.

The CMIAL instrument can be used in reflection mode or transmitted light mode. Another embodiment of the invention comprises an accessory filter wheel, including color filters and phase filters used in phase contrast mode, adjustable apertures, and various filter and beam splitter cube units. A laser scanner may be incorporated for laser position control relative to the sample. In addition to laser scanning optics, the sample can be scanned using a two-axis motorized control or a hydraulic control. A higher resolution positioning and focus control module using piezo-electric, magnetic or hydraulic motion control for higher precision applications can also be used.

Multiple camera or detector heads can be built into the CMIAL instrument module internal to the computer. However, multiple light beam paths are selectable by the instrument user by switching a computer controlled beam steering mirror. In addition, the light can be directed to accessory cameras mounted external to the computer that require larger space and may require additional space and additional cooling.

In one embodiment, the CMIAL may also contain an imaging module built into a computer. The imaging module comprises an imaging detector or imaging detector array.

A. CMIAL Instrument Module for a Desktop or Workstation

FIG. 1 is a diagram of one embodiment of a CMIAL instrument module for a desktop or workstation. The housing built into a desktop computer or workstation preferably into a standard 3.5-inch drive, a 5.25-inch drive bay, a CD or DVD compartment, or multiple compartments. The CMIAL electric control module may be interfaced to the computer's motherboard via, e.g., PCI or any other electronic interface to the motherboard. The CMIAL instrument is inside the housing 101. Housing 101 contains illumination means 102 and external viewing port 103. The external illumination means 102 reflects or transmits light.

B. CMIAL Instrument Module for a Laptop

Figure 2:
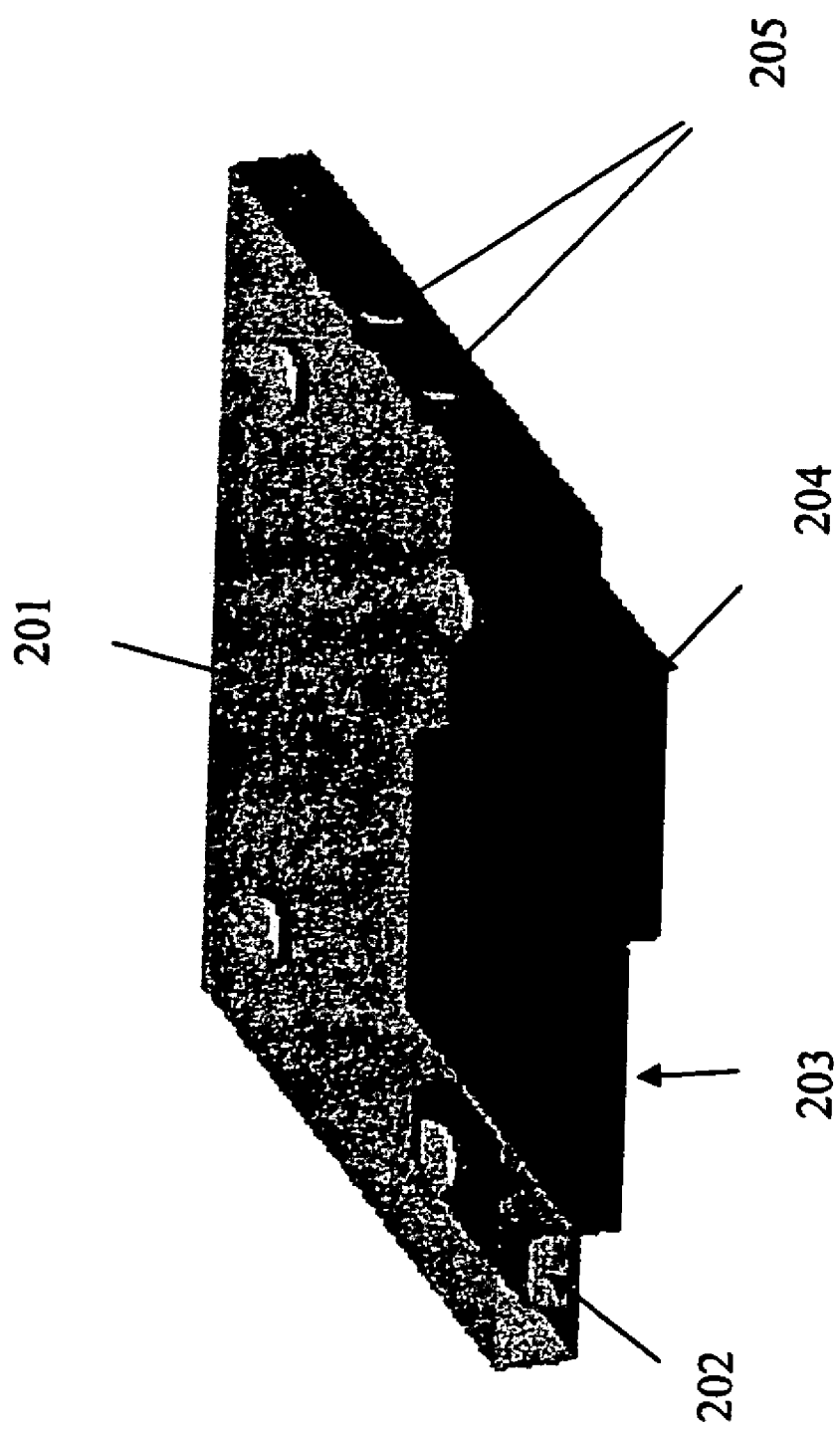
FIG. 2 is a diagram of a CMIAL instrument module housing built into a laptop computer, wherein external ports are shown such that internal or external illumination and internal or external light analysis instrumentation can be utilized.

In one embodiment of the invention, the microscope electronic component utilizes the motherboard of the computer. The screen of the laptop can be used to view images from the microscope. The laptop housing may also contain one or more external ports. The external port can be a view port or an analysis port. FIG. 2 is a diagram of that embodiment of a CMIAL module built into a laptop. Laptop housing 201 contains light source component 202, microscope component 203, light analysis component 204, and optionally an external port 205. External port 205 may be an external viewing port or an external analysis port. Laptop housing also contains the standard hardware, such as, e.g., motherboard, hard-drive, or memory, that is required for a functional laptop. Light passes from the light source component 202 through the microscope component 203, which contains the sample to be analyzed by the light analysis component 204. The light analysis component converts the light that passed through the microscope component 203 into a viewable image. This image may be displayed on the screen of the portable computer or on an external screen. The microscope component 203 contains the lenses that magnify the image to the desired magnification. The microscope component contains a sample holder onto which the sample is placed for analysis.

The instrument component for a desktop has a similar arrangement and contains a light source connected to the microscope component, connected to the light analysis component and an external viewing port. In one embodiment of the invention, the light source is external and illuminates the sample via a port (see FIG. 1).

C. Sample Holder

The CMIAL may additionally contain a sample supporter or holder. The sample supporter or holder has several forms including a retractable carriage similar to a CD or DVD disk carriage. Therefore, samples can be inserted into the CMIAL system similar to a CD or DVD disk table. A slot enables conventional microscope slides to be used. Additional sample holder sizes enable sample holders of varies sizes and geometries including a powder sample holder, a solid sample holder, and a liquid sample holder to be inserted into the CMIAL system.

Figure 3:
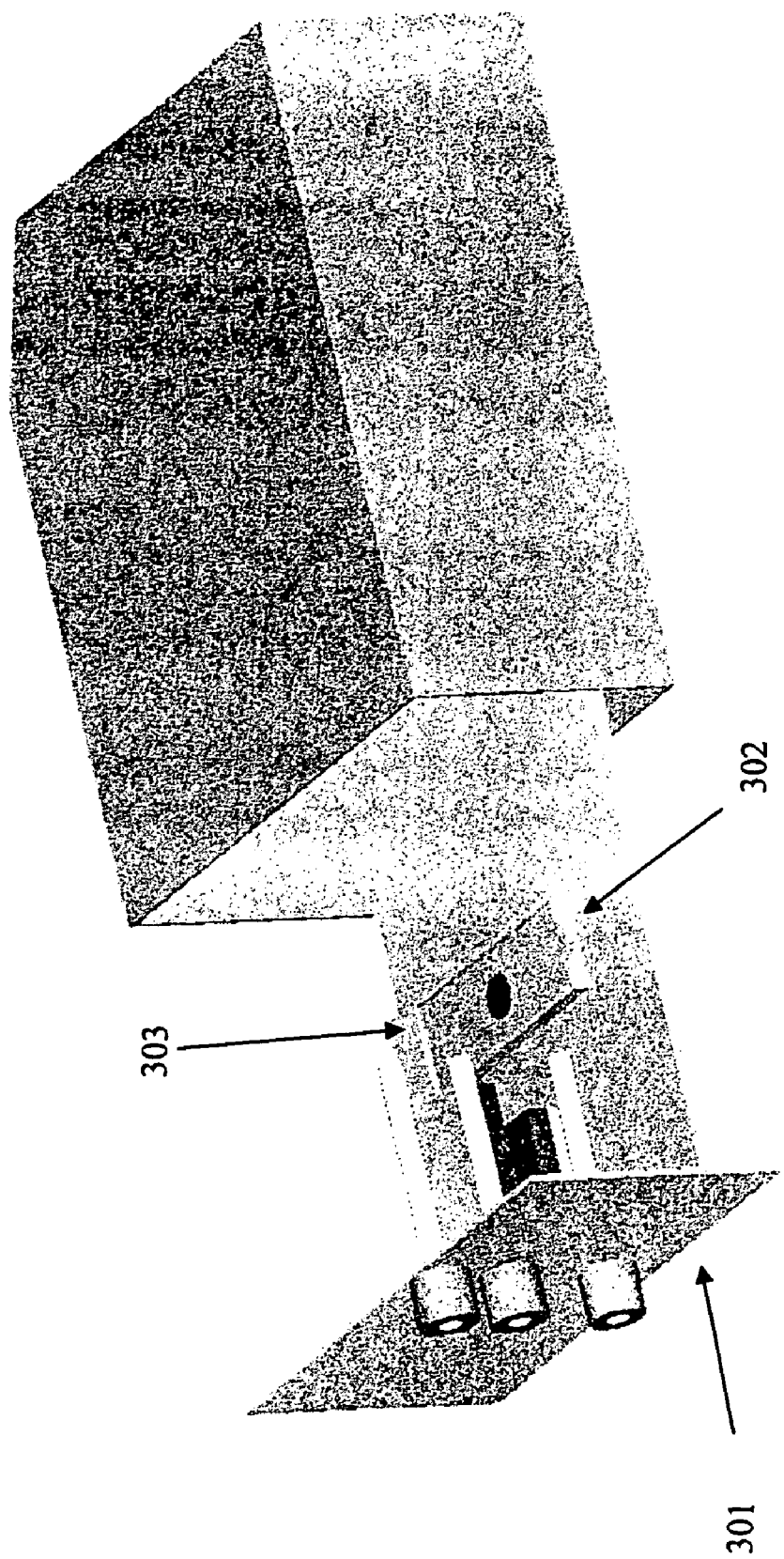
FIG. 3 shows a sample compartment and interchangeable modules for a CMIAL.

Thus, in one embodiment of the invention, the microscope component contains an interchangeable sample compartment. An exemplary configuration of the interchangeable sample compartment is shown in FIG. 3. The interchangeable sample compartment consists of a retractable carriage 301 onto which a sample holder 302 is mounted. The sample holder may optionally contain a microscope slide carrier (or stage) 303. The retractable carriage serves to create a two-dimensional translation stage, as commonly used in microscopy.

In another embodiment of the invention, the sample holder has a retractable carriage (a micro-carriage), a slide carrier, a 2-D translation stage, and a sample scanner.

The retractable carriage may advantageously be used as part of a miniature confocal microscope.

The sample holder may be configured in such a way as to hold more than one sample at a time to facilitate more rapid analysis.

D. Light Input/Output Ports

The CMIAL may comprise an optional external light input port or an optional external light output port. An external light source may be attached to the optional external light input port. The port external light may be used alone or injunction with an internal light source. The optional light output port can be used to attach a device for further processing of the magnified image, or, alternately, it can be used to attach an additional display.

E. Accessory Module Attachments

The CMIAL technology includes accessory modular attachments including, but not limited to, a miniature microscope stage or sample scanner, laser scanner, filter wheels, adjustable apertures, multiple objective lenses, adjustable magnification imaging lens, light detector in the form of a single element detector or a detector array, such as e.g., a Charge Couple Device (CCD), Complimentary Metal Oxide Semiconductor (CMOS), Avalanche Photodiode (APD), PIN, using any detector material, such as e.g., silicon, gallium-arsenide, indium-gallium-arsenide, for the analysis of light including the ultraviolet (UV), visible (VIS) or infrared (IR). Interchangeable light analysis modules interface to the microscope mainframe and can provide spectral analysis, polarimetry, photometry, fluorometry, or any other light analysis technique coupled to the CMIAL system.

F. Sample Scanning Configurations

One configuration of the CMIAL microscope includes a 2-axis galvanometer (or other) laser scanner to scan samples. A second configuration utilizes a 2-axis micro-motorized (hydraulic or other) lateral sample positioning stage. An alternative to the second configuration consists of a 2-axis sample positioning system; axis 1 rotates while axis two translates the laser head along a radial track to reach any location on a circular sample substrate similar to an optical Compact Disk (CD) drive. The round sample substrate rotates on a stabilized universal bearing that limits external vibration. The axial position of the optical microscope head is controlled with auto-focus optics and either a piezo-electric or magnetic type voice-coil for focus control.

G. Vibration Isolation

A key innovation to the CMIAL invention is a vibration isolation system to stabilize the sample for high magnification microscopy analysis. The vibration isolation sample holder may be an optional attachment for high magnification applications, e.g., 1,000× magnification. The CMIAL system incorporates a fanless computer power supply module, which eliminates fans that can vibrate. A semi-conductor Peltier cooling wafer has no moving parts and can be attached to power supply electronics that require cooling.

H. Wet Sample Compartment

Another key innovation is a sample holder compartment that enables wet samples to be analyzed. The sample compartment has a sealed chamber to prevent liquid from getting into the computer. The sample compartment is removable and can easily be cleaned. This wet sample compartment is housed within the microscope component.

I. Internal Motion Controller

Figure 10:
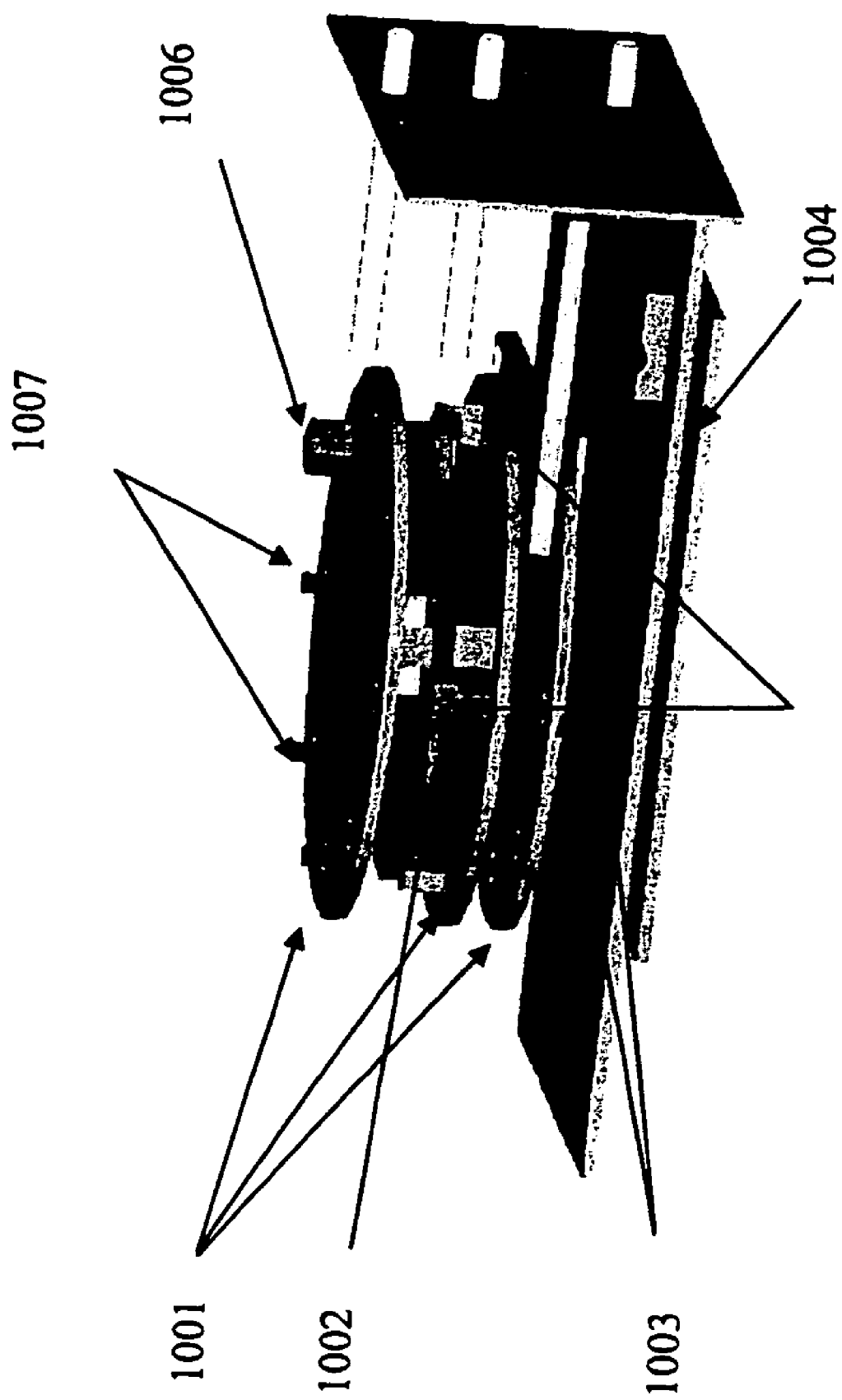
FIG. 10 is a diagram showing multiple accessory modules, beam switching and accessory turrets.

The CMIAL instrument may optionally incorporate miniature internal motion controllers to maneuver the sample within the computer instrument including lateral x, y positioning of the sample as well as focus or z position control (see FIG. 10). One configuration of the CMIAL system incorporates laser scanner mirrors in the optical beam path to enable laser scanning of the sample in conventional confocal mode (see FIG. 5). An alternative sample scanning configuration utilizes a miniature sample position controller. This configuration is similar to a CD player where the azimuthal position of the optical disk is controlled via a rotating bearing platform and a radial track that translates the laser focusing and detection head. The CMIAL microscope objective focus position is controlled using a real-time magnetic voice-coil, piezo-electric or hydraulic focusing controller that can be activated or deactivated automatically when a sample holder is not engaged or by the user when a sample is being prepared.

J. Software

The CMIAL system utilizes special software to control the system mechanics and image and data analysis. In one embodiment, the CMIAL includes a software program. This software program has a user interface to control all the features of the CMIAL microscope, including available light sources, available detectors, and available analysis instrumentation. Functionality of the CMIAL technology is controlled using embedded electronics within the electronics module using low level device drivers as well as high level user interface controls of microscope features. User interface software is installed within the workings of the computer operating system for imaging and data collection and storage. The software user interface allows the user to control the functions of the microscope, light source, and analysis instrumentation including experiment setup parameters. Software add-on modules are distributed with the CMIAL package and accessory packages for control over new analysis instrumentation as they are developed. The software user interface is not limited to any particular operating system, such as e.g., Windows, UNIX, or Macintosh. The software program may also be remotely controlled.

K. Computer Controlled Miniature Microscope Positioning Stage

A computer-controlled sample positioning system enables the user to maneuver the sample in three dimensions. A focus mechanism enables the user to control the focus of the instrument. An automated focus control unit can be initiated when the desired focus has been achieved.

II. Conventional Mode

The CMIAL invention includes a high power microscope module for conventional microscopy analysis and includes interchangeable modular accessories of light microscopy, such as e.g., multiple light sources, filter attachments, and detector and analysis devices.

III. Confocal Mode

Figure 8:
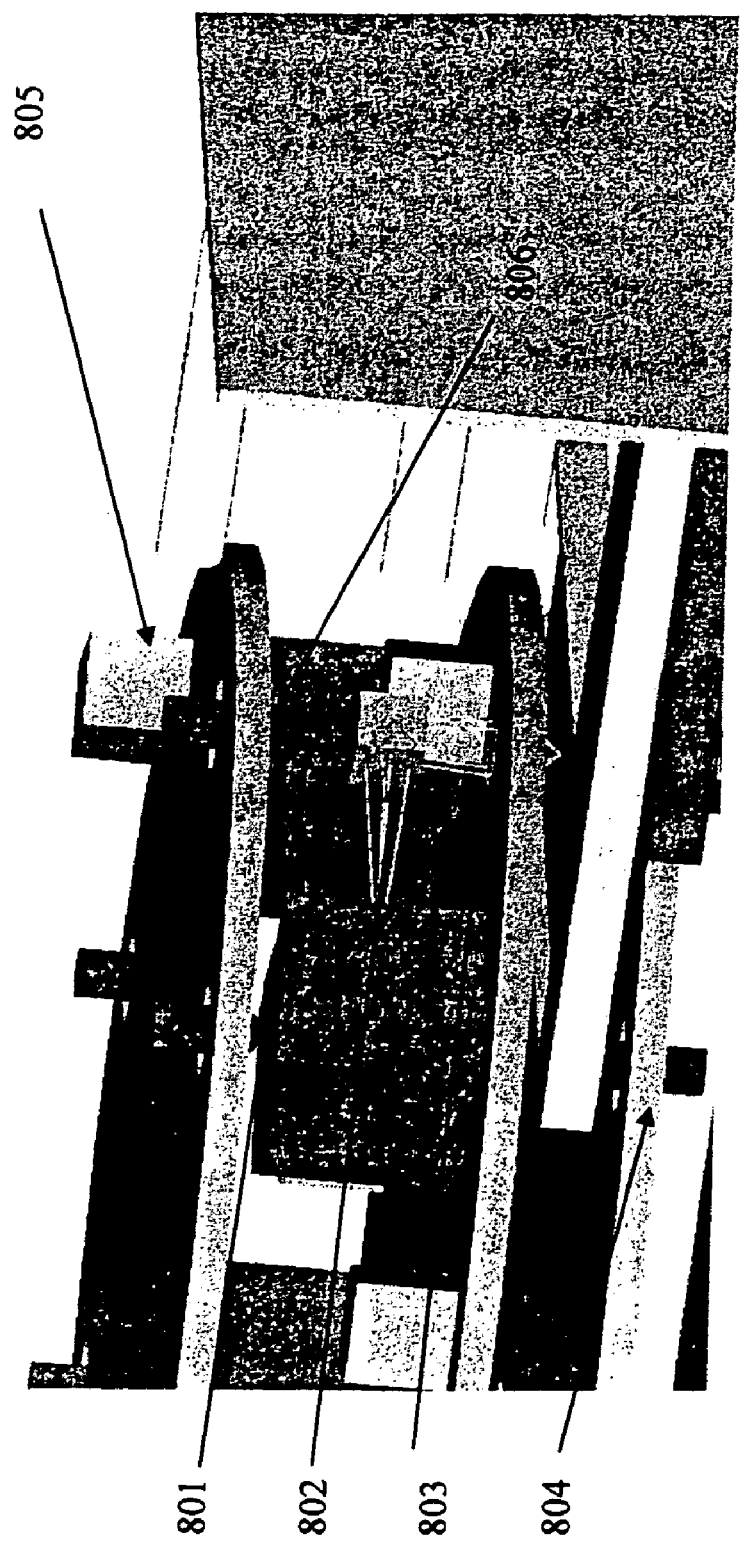
FIG. 8 shows epi-illumination and detection beam paths in a CMIAL.

The CMIAL microscope can take the form of a high power confocal microscope using an optical configuration similar to a laser compact disk (CD) or digital videodisk (DVD) drive that is used for data storage only if used for imaging in this configuration (see FIG. 8). This configuration allows the user to perform all confocal and related imaging techniques, such as, for example, fluorescence confocal imaging. The confocal microscope module brings the power of confocal microscopy into the chassis of a computer and in the hands of everyone that can benefit from confocal microscopy.

Figure 4:
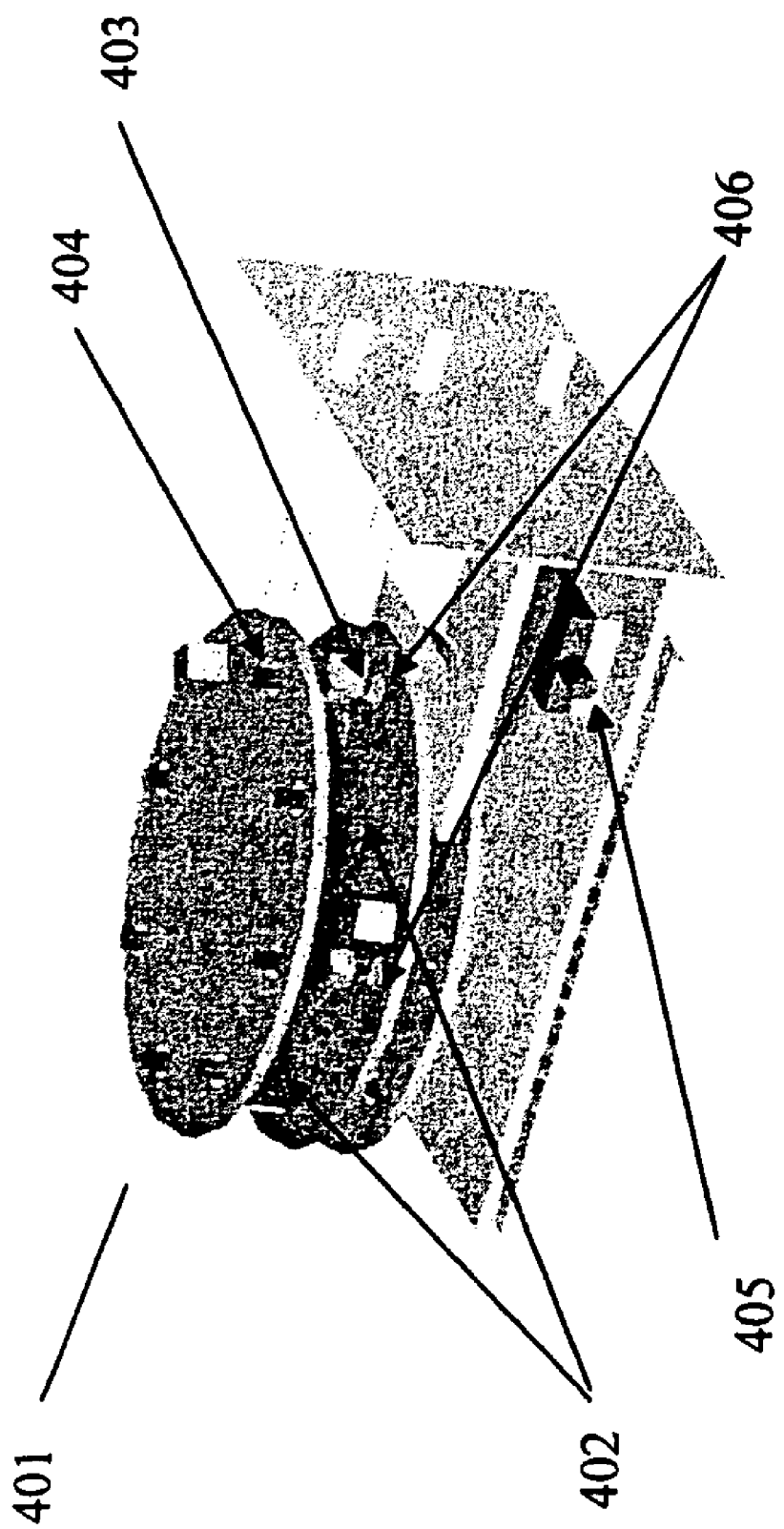
FIG. 4 shows accessory modules for a CMIAL, including beam switching, filter wheel cartridge, light source, and detector modules.

One embodiment of the invention is a miniature confocal microscope; the miniature confocal microscope additionally may contain a means for beam switching, a filter wheel cartridge, light source, and detector (see FIG. 4). Confocal microscope 401 contains at least a light source 402 for producing a beam of light 403, an imaging detector 404, a sample scanner 405 and at least one objective lens 406. The imaging detector 404 may be an imaging array. In one embodiment of the confocal microscope, the objective lens 406 is arranged in a turret, which contains a range of numerical aperture (NA) objectives.

The CMIAL miniaturized confocal microscope module utilizes an optical system that is similar to the optical configuration of an optical CD ROM or DVD optical drive which includes a laser illumination source, optical beam control, focusing optics and automated focusing servo controller, and optical detector. The CMIAL confocal module incorporates 3-dimension control of the viewing sample-utilizing x and y positioning control as well as focus (z) control.

The CMIAL may also contain a laser scanner module or a sample scanner module. The laser scanner module or sample scanner module enables high-resolution confocal microscopy. The sample can remain stationary in one mode and a scanning mirror steers the laser or other illumination sources over the sample. In another mode, the light source can remain stationary and the sample scan underneath a tightly focused beam. The application will determine which scan configuration is practical. Light leaving the sample can be directed via an output beam switching mirror or beam splitter to a confocal or imaging detector, or to accessory light analysis instrumentation, to enable high-resolution spectral analysis of the sample.

In another embodiment, the miniature confocal CMIAL also incorporates laser scanning of the sample.

IV. Epi- and Trans-Illumination CMIAL

Figure 5:
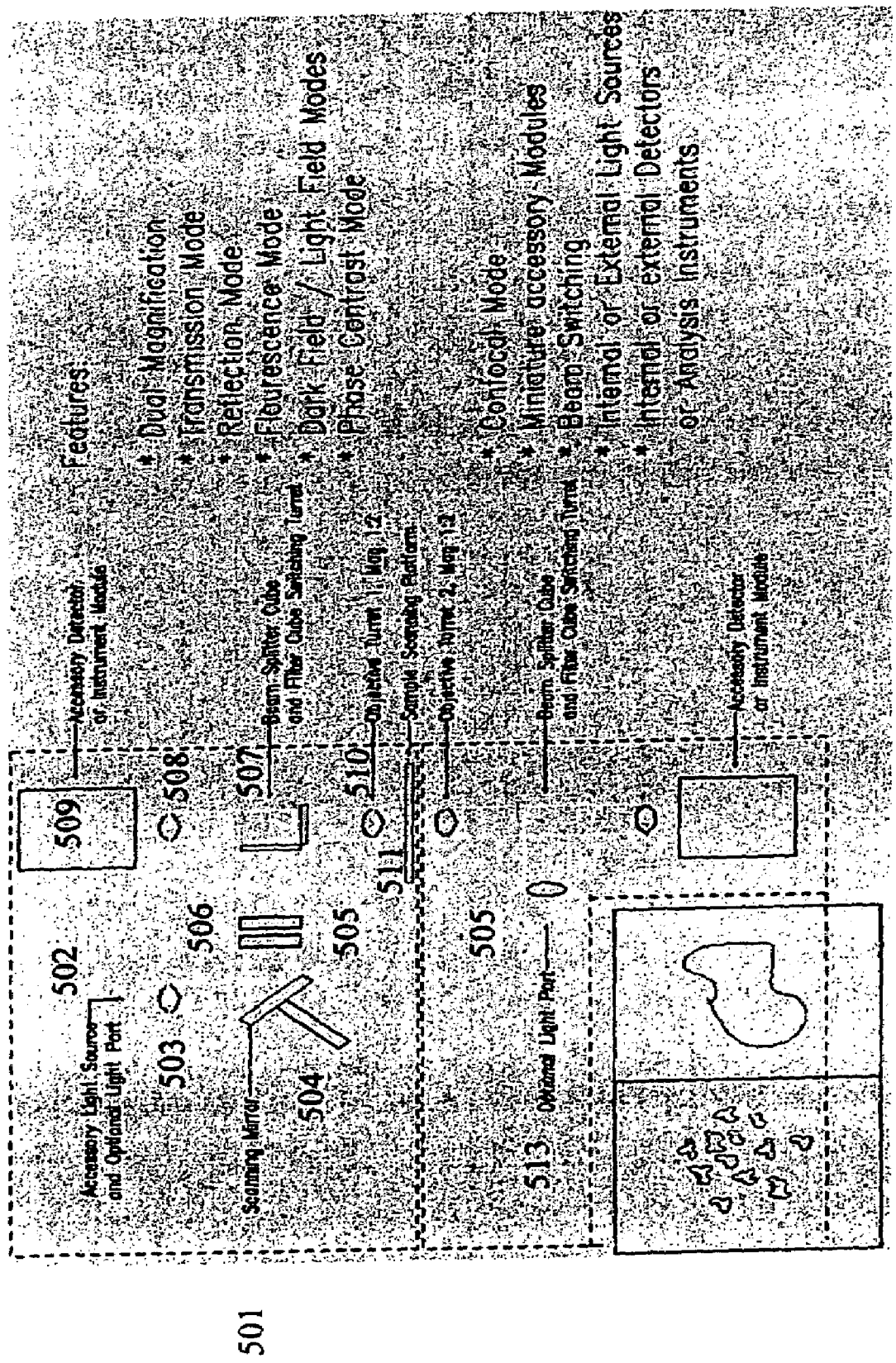
FIG. 5 shows a combined epi-illumination and trans-illumination microscope module with simultaneous dual field of view imaging.

Another key innovation of the CMIAL technology is the combination of a dual mode or dual field of view configuration that integrates epi-illumination and trans-illumination (see FIG. 5). The combination of a miniature epi-illumination and trans-illumination system into one microscope can be applied to conventional laboratory microscopes and eliminate the need for multiple expensive microscopes in the laboratory. Certain applications require epi-illumination while others require trans-illumination depending on the application, sample, and sample substrate. By combining an epi-illumination optical configuration with a trans-illumination optical configuration, microscope users only need to purchase a single instrument that is less expensive than two microscopes and occupies less space. Depending on the configuration of choice for a particular application, the epi-illumination module serves as the high power-imaging module, while the trans-illumination module serves as the low magnification wide field-imaging module.

The combination of epi-illumination and trans-illumination (i.e., a dual mode epi-illumination and trans-illumination CMIAL) may be housed inside of a light source module or alternatively inside a combination of a light source and microscope module. FIG. 5 shows one embodiment of such a combination of epi-illumination and trans-illumination CMIAL (i.e., a dual mode, dual field CMIAL).

In FIG. 5, epi-illumination arrangement 501 contains an accessory light source 502, which creates beam of light 503. The beam of light 503 follows a path from light source 502 to scanning mirror 504 through adjustable aperture 505 to beam splitter 507. The adjustable aperture 505 may optionally contain diaphragm 506. Beam splitter 507 optimally consists of a beam splitter cube and a filter cube-switching turret. The beam splitter 507 serves as either a beam splitter or a beam combiner. From the beam splitter 507, the light passes through objective turret 510 onto sample screening platform 511 through imaging lens 508 into accessory detector or instrument module 509.

Optionally, the light source may be provided through an external light port or, alternatively, an additional light source may be provided through an external light port.

The trans-illumination arrangement 512 contains optional light port 513, beam splitter 507, which optimally consists of a beam splitter cube and a filter cube-switching turret, imaging lens 508 and object turret 510. Like any standard trans-illumination microscope, the arrangement of the parts transmits light through a sample, which can be illuminated from above or below.

A combination of epi-illumination and trans-illumination optimally allows for e.g., dual magnification, a transmission mode, a reflection mode, a fluorescence mode, dark/field modes, a phase contrast mode, and a confocal mode.

In another embodiment, the epi-illumination or trans-illumination module consists of selectable magnifying imaging lenses, filters, beam combiner, and selectable numerical aperture objectives.

In an alternate embodiment of the invention, the CMIAL has either epi-illumination or trans-illumination.

V. Other Features

The CMIAL is built within interchangeable modules inside of a desktop or laptop computer that enable numerous light microscope configurations and accessories including, but not limited to, confocal microscopy where laser light is used to scan a fluorescent sample making use of, for example, a computer controlled adjustable confocal aperture or filter wheels.

Figure 6:
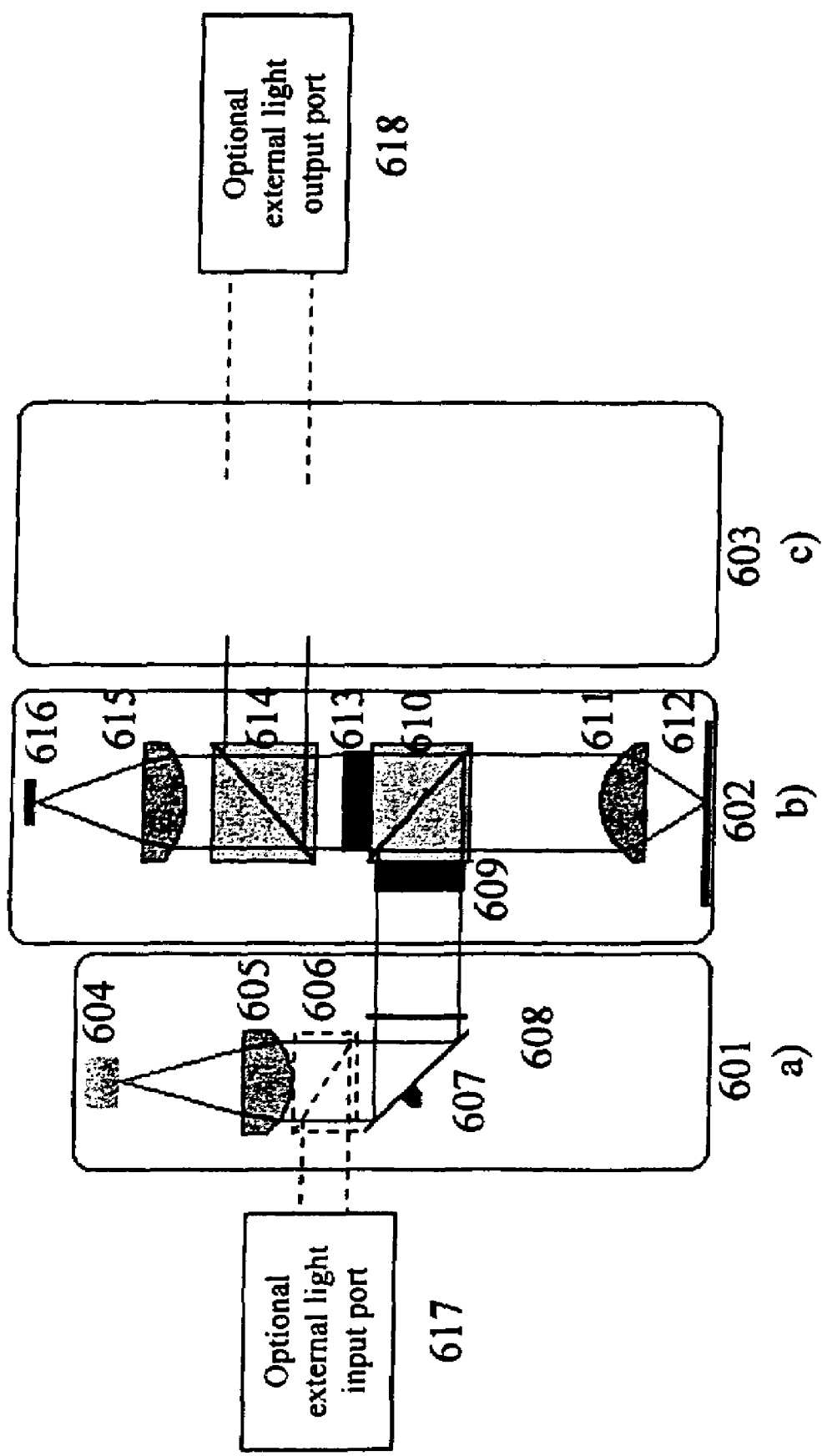
FIG. 6 shows a layout of the modular units including the light path directed to accessory light analysis modules for spectroscopy, polarimetery, or other medical sensors.

FIG. 6 is an embodiment of a CMIAL according to the present invention. The CMIAL encompasses a light source component 601 connected to microscope component 602, which in turn is connected to light analysis component 603. The light source component contains a light source 604, which produces beam of light 605. The light source component also has an optional external light input port 617. The beam of light passes from the light source 604 through collimating lens 606 to scan mirror 607 and then it passes through adjustable aperture 608 into the microscope component 602. An optional external light input port may be located between the collimating lens 606 and scan mirror 607. Once inside the microscope component 602, the beam of light basses through a filter 609 into a beam splitter 610. The beam splitter 610 may be a beam splitter cube, or any other dichroic or amplitude splitting element. The beam splitter 610 the beam of light is directed to sample 612. The beam of light from the beam splitter reflects off sample 612 such that image 611 is created. Additional lenses may be placed in between the beam splitter and the sample. The image of the sample, image 611, passes through the beam splitter 610, through filter 613 through beam relay 614, through imaging lens 615 into imaging plane 616. At imaging plane 616, a detector may be located, which may be part of the light analysis component. As the image passes through beam relay 614, part of the image can be relayed to external analysis port 618.

The CMIAL technology includes a modular microscope and light analysis instrumentation built inside of a computer with interchangeable accessory modules (FIGS. 7 & 8), such as e.g., modular light sources including, but not limited to, white light, tungsten halogen, Light Emitting Diodes (LED's) of any single color or broadband spectral output, ultraviolet (UV), visible (VIS), near-infrared (NIR) or infrared (IR) illumination sources in addition to laser diode modules.

Figure 7:
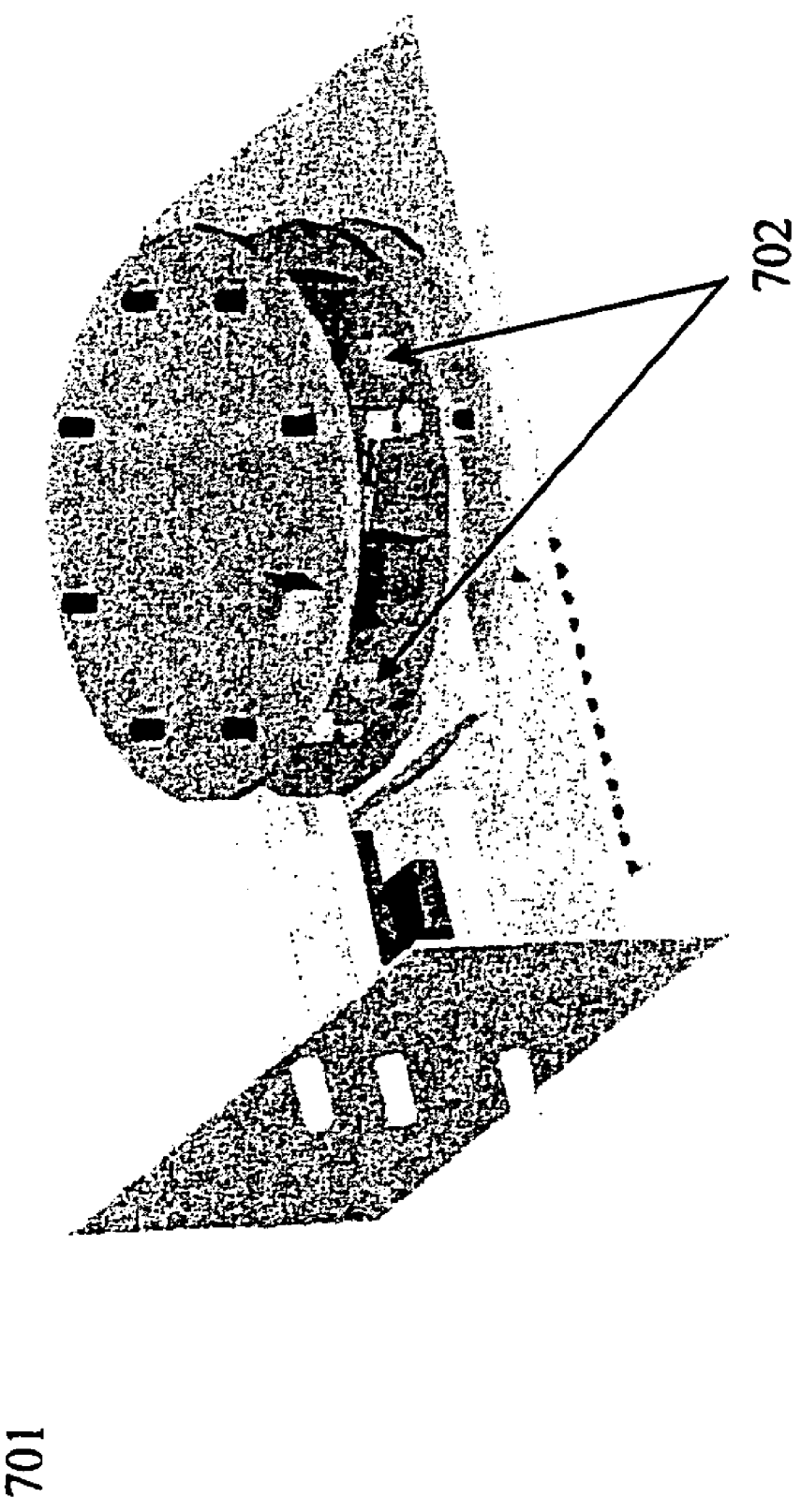
FIG. 7 shows removable accessory modules for a CMIAL.

FIG. 7 is one embodiment of an interchangeable accessory module. Multiple accessory rotating turrets provide user selectable detectors, selectable magnification, and selectable microscopy technique. The interchangeable accessory module 701 contains the entire CMIAL apparatus. Highlighted in FIG. 7 is light source 702. This embodiment includes beam splitter cubes and may be particularly useful for fluorescence, dark field, or bright field microscopy.

FIG. 8 is another embodiment of an interchangeable accessory module. The interchangeable accessory module is a confocal light microscope equipped with fluorescence excitation and emission filters, adjustable confocal pinhole, or "aperture" situated in the imaging beam 801. The microscope module, light source module and standard detector or imaging detector are depicted; a light analysis instrument is not shown. The interchangeable module contains microscope mounted below microscope objective 803 that generates a larger field of view to guide the confocal microscope to the desired location on the sample. Beam splitter assembly 802 is located adjacent to the microscope objective lens 803. The beam splitter assembly 802 separates the illumination beam (excitation beam) from the imaging beam (emission beam). The focusing objective lens 803 that can be a single lens or a multiple lens holder in the form of a rotary turret or translation stage. The interchangeable module also has light source 805, magnifying lens 806, and trans-illumination means 804.

Since the CMIAL is part of a computer, it may optionally utilize imaging software. In one embodiment of the invention, the imaging software digitally enhances images using diffraction analysis algorithms such as deconvolution techniques. Software digital zoom functions (similar to those found in a digital camera) are also available when low magnification is used in wider field of view applications. In another embodiment of the invention, the imaging software extracts characterizing features from the image, compares the image to features of known objects or cells, and thus helps to identify the object or cell.

In certain embodiments, the Computer Microscope (CMIAL) can utilize accessory modules that insert into a computer to allow reflected light microscopy and or transmitted light microscopy (see FIG. 9) including, but not limited to, polarization microscopy, dark field, bright field, phase contrast, filter fluorescence, and confocal fluorescence. These microscope modules will insert into accessory compartments within a desktop computer or laptop computer, such as a battery compartment or Compact Disk (CD) or Digital Video Disk (DVD) compartment.

Figure 9:
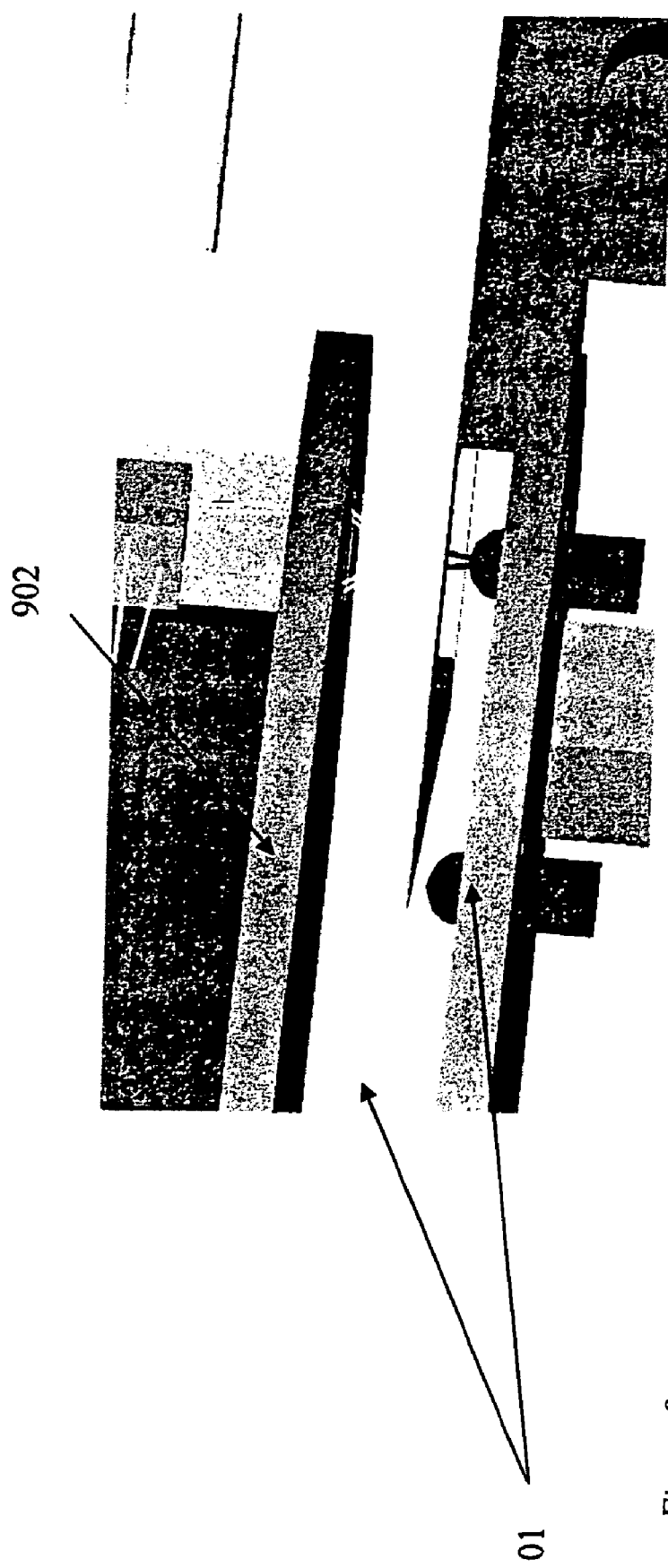
FIG. 9 is a diagram showing the beam path used in transmission mode as well as the accessory light source, detector and beam splitter or filter turrets.

Thus, one embodiment of the invention is a dual Field-Of-View (FOV) CMIAL as shown in FIG. 9. This dual-field CMIAL contains a microscope objective 902 mounted in a selectable turret and a means 901 for either or both transmission (for e.g., for phase-contrast imaging) or reflected light illumination. Rotary turrets enable the user to select from a variety of magnification objectives and a variety of light sources as well as illumination methods.

Additionally, an optional removable objective module enables the user to access samples that are impractical to insert into the sample compartment, such as large bulky samples as well as hazardous liquid, solid, or gaseous samples.

One configuration of the CMIAL utilizes a microscope focusing lens that is an infinity corrected lens such that the return light from the sample in epi-illumination mode is collimated. The collimated beam is either directed to a re-imaging lens then onto an imaging detector or spot detector, or redirected along an alternate optical path using a beam splitter cube, flip-in, or slide-in mirror. The collimated return beam from the sample can be redirected to a number of light detectors or light analysis instruments. One embodiment of such a configuration is shown in FIG. 10. The CMIAL is mounted on a retractable module 1004. The CMIAL includes multiple selectable turrets 1001. The multiple selectable turrets 1001 are mounted onto the retractable module 1004 in such a way that the turrets can rotate freely. Onto the multiple selectable turrets 1001, light source and relay optics 1002 and microscope objective 1005 are mounted. On top of multiple selectable turrets 1001, light detector 1007 is mounted. The light detector 1007 may be an image sensor or other light analysis instruments. The retractable turrets 1001 also contain beam relay cube 1006.

The CMIAL may also optionally contain a trans-illumination microscope 1003. The trans-illumination microscope 1003 is mounted between the retractable module 1004 and the multiple selectable turrets 1001.

Figure 11:
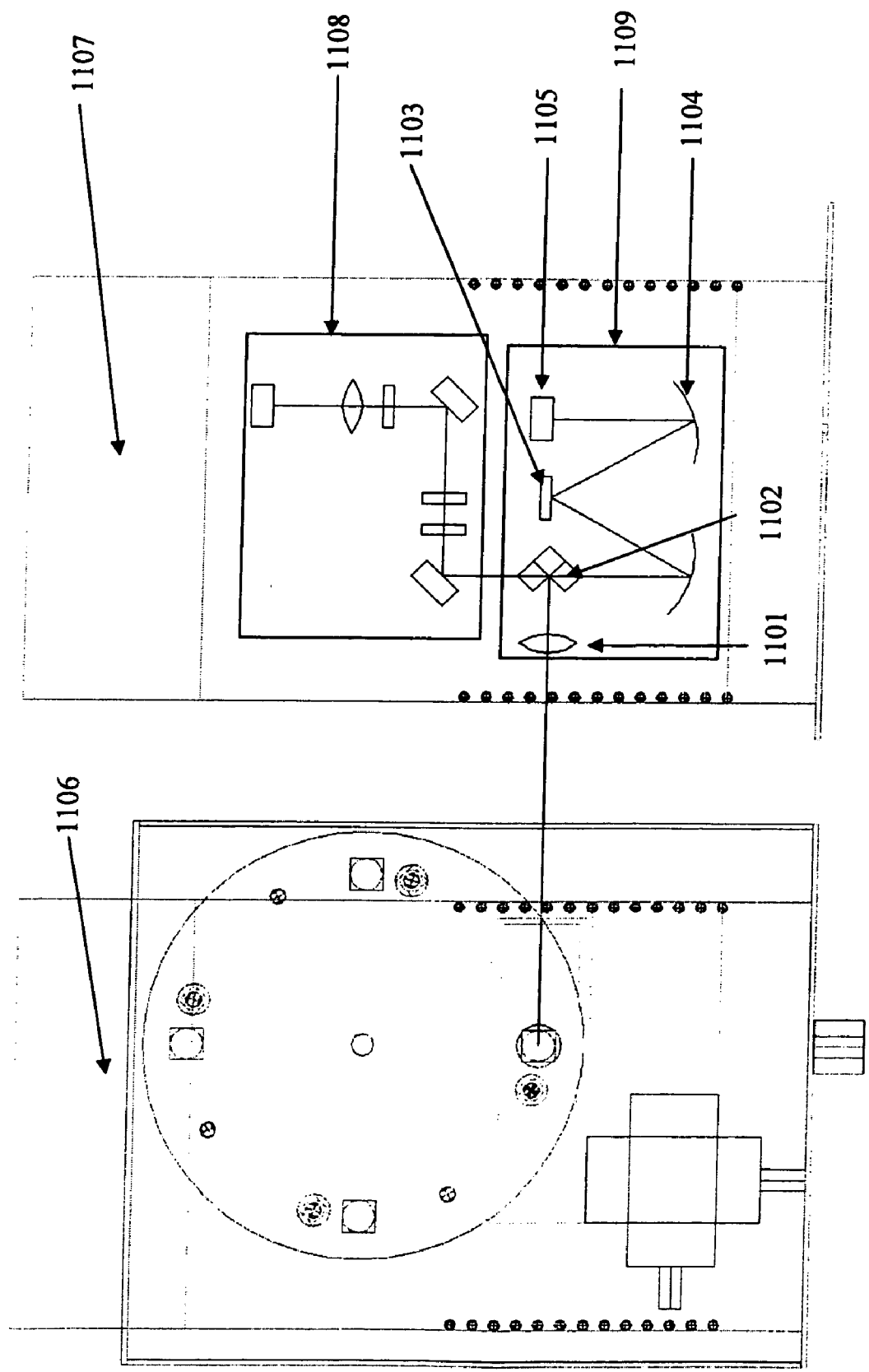
FIG. 11 is a top view of one embodiment of a microscope component and light analysis component according to the present invention. The lower right section of the light analysis instrument consists of a spectrometer for interrogating light from a sample. The upper right section of the light analysis instrument module contains a polarimeter.

The light analysis instrument may take the form of a spectral analysis instrument (as shown in FIG. 11). The microscope module 1106 is shown on the left and the light analysis module 1107 is shown on the right. The light analysis module consists of polarimeter 1108 and spectrometer 1109. Polarimeter 1108 is a generic polarimeter instrument and contains polarizers, an optical wave-plate or phase retarder, turn or "fold" mirrors and a final re-imaging lens in front of a detector. Spectrometer 1109 is used for interrogating light from the sample. In the spectral analysis instrument (FIG. 11), the incident light is focused to the entrance of a spectrometer module comprising a relay lens or mirror 1101, a beam switching mirror 1102 to direct light to a polarimeter, spectrometer or other module, a diffraction grating 1103 for the spectrum under analysis, a final focusing lens 1104, mirror or diffractive optic and a spectral analysis detector 1105 comprising either a single detector that is scanned or a 1-dimensional array or a 2-dimensional array to collect the spectrum under analysis.

In another embodiment, medical sensor modules can interconnect to the CMIAL system enabling optical, electronic and data collection interface between each medical sensor module and the onboard CMIAL mainframe module. The CMIAL system incorporates interchangeable modules for different applications, including a range of medical modules enabling an individual to do home testing of diabetes, and pregnancy. Multiple light paths are available for accessory instruments that are internal to the computer or external in the laboratory for additional light analysis.

It is envisioned that medical sensors will be developed for various tests to be performed by an individual, or professional, in the privacy of their home, office, clinic, field, or other location. Such medical sensors will include, but not be limited to, those for diabetes, pregnancy, and blood tests. Other tests that could be performed with future medical sensors could include those for urine, blood serum, skin lesions for melanoma, and eye exams.

This innovative technology can also bring health care into the home. In addition to home health care medical tests and field tests for medical examiners, researchers, professors and students, the CMIAL technology can bring high power optical microscope imaging and data analysis technology to the field where the sample, experiment is located. Thus, in one embodiment, the CMIAL system includes modules to enable the medical professional to analyze tissue samples or run blood or other medical tests.

It is envisioned that optical modules will be able to interface to the CMIAL optical mainframe and can be used for several applications, such as crime scene investigations, military missions, personal security for optical encoding/decoding, security coded personal information, fingerprint scanners, retinal scanner, blood analysis, preliminary DNA analysis, hair follicle analysis and other crime scene evidence for real-time decision making.

The CMIAL system incorporates an optional fiber optic imaging bundle cable that can be connected to a viewing port on the computer. The fiber cable intercepts the microscope image and provides an intermediate image, which is relayed to the opposite end of the fiber cable and re-imaged to the eye using an eyepiece. This enables the user to view samples using techniques they are familiar with, such as the human eye or eye glass viewer.

The CMIAL system has the potential to replace conventional laboratory microscope instruments. A key innovation of the CMIAL system is the combination of a dual mode, dual field of view epi-illumination and trans-illumination microscope combined into a compact optical module built into a computer. The computer monitor provides a convenient imaging screen. A wide field microscope module is co-bore-sighted to a high power narrow field microscope module. The wide field module enables the user to view a large portion of the sample on a computer screen for positioning the sample to the desired observation location. Microscope viewing and analysis is performed using the computer monitor as the user interface. The optional fiber cable coupled to an eyepiece holder enables the user to view the sample using a small eyepiece holder that can be supported by an eyepiece stand accessory kit.

The detector module may include an imaging array connected to the wide field guider. A low noise detector or detector array is coupled to the high magnification microscope module. A variety of detector modules is available for the user to select depending on the desired application.

In one embodiment, the CMIAL contains an optical light path beam selector. The optical light path beam selector is computer controlled and enables the user to rotate parts of the apparatus, such as e.g., an optical mirror, scanner, and beam splitter to a variety of optical ports. The multiple optical ports enables external light sources to be coupled to the CMIAL system or direct the light under analysis to external instruments to enable the use of accessory instrument modules, including, but not limited to, spectrometer or other laboratory instruments that might exist in the user's laboratory. The beam selector enables the conversion between reflected light microscope convention and transmitted light microscope convention.

The CMIAL imaging head can be disconnected from the computer to enable the user to analyze external samples that are not practical to insert into the computer.

Special cleaning inserts enable the user to clean the internal areas of the CMIAL instrument.

In one embodiment of the invention, the microscope module comprises a fluorescence microscope that incorporates one or more fluorescence filters and one or more dichroic beam splitters.

In another embodiment of the invention, the microscope module incorporates a selectable beam splitter cube mounted on a turret, enabling fluorescence, dark field, bright field, or phase contrast imaging.

In an alternate embodiment, the CMIAL has the following modular attachments: a miniature microscope stage, a laser scanner, a sample scanner, filter wheels, adjustable apertures, multiple objective lenses, adjustable magnification imaging lens.

In yet another embodiment of the invention, the light detector is selected from the group consisting of a Charge Couple Device, a Complimentary Metal Oxide Semiconductor, and an Avalanche Photodiode.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A computer mounted microscope comprising:
   (a) a light source component comprising a means for producing a beam of light;
   (b) a microscope component with at least one microscope comprising a lens system to focus an image carried by the beam of light onto an imaging plane;
   (c) a light analysis component; and
   (d) a computer;
   wherein the light source component is connected to the microscope component and said microscope component is connected to the light analysis component,
   wherein the lens system comprises an objective lens, and
   wherein the objective lens, light source component, computer, and light analysis component are housed within a common frame.

2. The computer mounted microscope of claim 1, wherein the light analysis component comprises at least one optical assembly used to analyze light collected from a sample.

3. The computer mounted microscope of claim 2, wherein the light analysis component comprises an imaging detector or detector array.

4. The computer mounted microscope of claim 1, wherein the microscope component further comprises a means for holding a sample.

5. The computer mounted microscope of claim 4, wherein the means for holding the sample comprises a retractable carriage.

6. The computer mounted microscope of claim 1, wherein the microscope component comprises a microscope slide carrier, a multi-dimensional translation stage or a sample scanner.

7. The computer mounted microscope of claim 1, further comprising an external light input port.

8. The computer mounted microscope of claim 1, further comprising an external analysis port.

9. The computer mounted microscope of claim 1, further comprising an external viewing port.

10. The computer mounted microscope of claim 1, wherein the light source component is mounted inside the microscope component.

11. The computer mounted microscope of claim 10, wherein the microscope component comprise at least one epi-illumination microscope or at least one trans-illumination microscope.

12. The computer mounted microscope of claim 10, wherein the microscope component further comprises a magnification imaging lens, filters, a beam combiner, and at least one selectable Numerical Aperture objective lens.

13. The computer mounted microscope of claim 10, wherein the microscope component comprises a dual mode epi-illumination and trans-illumination microscope.

14. The computer mounted microscope of claim 10, wherein the microscope component comprises a dual Field-Of-View (FOV) microscope.

15. The computer mounted microscope of claim 10, wherein the microscope component comprises a confocal microscope that incorporates laser scanning of the sample.

16. The computer mounted microscope of claim 10, wherein the microscope component comprises a fluorescence microscope that incorporates fluorescence filters and dichroic beam splitter.

17. The computer mounted microscope of claim 1, wherein the microscope component comprises a selectable beam splitter cube turret, wherein the turret enables fluorescence, dark field, bright field, or phase contrast imaging.

18. The computer mounted microscope of claim 1, wherein the light source component, the microscope component and the light analysis component are each interchangeable accessory modules.

19. The computer mounted microscope of claim 1, wherein the light source component comprises at least one means for producing light selected from the group consisting of an LED, a laser diode, a white light source, a tungsten halogen light source, a UV light source, an infrared light source and a visible light source.

20. The computer mounted microscope of claim 1, wherein the microscope component further comprises at least one of the following modular attachments: a miniature microscope stage, a laser scanner, a sample scanner, filter wheels, adjustable apertures, multiple objective lenses, and an adjustable magnification imaging lens.

21. The computer mounted microscope of claim 1, wherein the computer is selected from the group consisting of a desktop, a workstation, and a portable laptop.

22. The computer mounted microscope of claim 1, wherein the light analysis component is selected from the group consisting of a photodiode, an imaging detector array, a spectrometer, a polarimeter, a photometer, a medical sensor, a fluorescence imager, a fluorescence analyzer, a Charge Couple Device, a Complimentary Metal Oxide Semiconductor, and an Avalanche Photodiode.

* * * * *